United States Patent [19]
Aoki

[11] 4,394,144
[45] Jul. 19, 1983

[54] DEHUMIDIFYING CONTAINER
[75] Inventor: Yoshio Aoki, Koga, Japan
[73] Assignee: Kaken Chemical Co., Ltd., Tokyo, Japan
[21] Appl. No.: 299,263
[22] Filed: Sep. 3, 1981
[51] Int. Cl.³ .................. B01D 53/14; B01D 53/26
[52] U.S. Cl. .................................. 55/281; 34/80; 55/388; 55/512; 206/204
[58] Field of Search .............. 55/280, 281, 388, 387, 55/512, 517; 422/218, 102, 264, 277, 283; 34/80, 81; 206/204

[56] References Cited
U.S. PATENT DOCUMENTS

| | | | |
|---|---|---|---|
| 537,184 | 4/1895 | Dexter | 55/281 X |
| 556,692 | 3/1896 | Purves | 55/281 |
| 1,620,155 | 3/1927 | Hilliard | 55/512 |
| 2,495,619 | 1/1950 | Weierman | 55/281 |
| 4,250,911 | 2/1981 | Kratz | 422/264 X |

FOREIGN PATENT DOCUMENTS

| | | | |
|---|---|---|---|
| 1214147 | 4/1960 | France | 55/387 |
| 345474 | 1/1937 | Italy | 55/517 |
| 416081 | 9/1934 | United Kingdom | 55/387 |

Primary Examiner—Kathleen J. Prunner
Attorney, Agent, or Firm—Sughrue, Mion, Zinn, Macpeak and Seas

[57] ABSTRACT

A dehumidifying container comprises an inner container having an opening at its upper end, and a bottom portion. The inner container is filled with a dehumidifying agent and has a discharge pipe provided upright at the center of its bottom portion. The discharge pipe has at least one slit in a wall thereof and an open lower end which protrudes downwardly through the bottom portion of the inner container. The inner container is detachably fitted into an outer container in such a manner that a space having a predetermined volume is formed between the respective bottom portions of the inner and outer containers. The dehumidifying agent absorbs moisture from the air and the so formed solution of the agent flows readily through the or each slit in the discharge pipe out through the open lower end of the pipe, and into said space. The upper end of the pipe is also open to assist such flow.

8 Claims, 6 Drawing Figures

DEHUMIDIFYING CONTAINER

BACKGROUND OF THE INVENTION

The present invention relates to a dehumidifying container which is intended to be placed in a room, a closet, a wall locker, or the like to absorb moisture in the air therein.

In a conventional dehumidifying container, as shown in FIGS. 1 and 2, an inner container b is fitted in an outer container a, and a groove c is formed in the periphery of the bottom of the inner container b. A plurality of small holes d are formed in the groove c. Calcium chloride e, which fills the inner container b, absorbs or catches moisture in the air. The moisture thus caught dissolves the calcium chloride e thereby to form a calcium chloride solution. The calcium chloride solution flows through the small holes d in the inner container into the outer container a, where it gathers as a pool. In FIG. 1, reference character f designates a cover, which can be fitted on the container a to close the container b when it is not desired for the dehumidifying container to be in use.

In the conventional dehumidifying container described, the small holes d are formed in the bottom of the container b in order to allow the calcium chloride e solution to drop into the outer container a. Therefore, it takes a relatively long time for the calcium chloride solution to reach the small holes d from above, and therefore it is rather difficult to catch the calcium chloride solution. Furthermore, since the calcium chloride solution is viscous, it is liable to form a pool in the groove c. That is, it is rather difficult to cause the calcium chloride solution to drop through the small holes d. This difficulty may be eliminated by increasing the diameter of the small holes. However, this method provides another difficulty that the increase of the diameter of the small holes causes the calcium chloride in the form of powder to drop through the holes.

SUMMARY OF THE INVENTION

It is thus an object of the present invention to provide a dehumidifying container in which the disadvantages of the known device are eliminated or at least minimized.

According to the invention there is provided a dehumidifying container comprising an inner container which is formed so as to be filled with a dehumidifying agent, the inner container having a discharge pipe with at least one slit in a wall thereof, the discharge pipe being provided upright from a bottom portion of the inner container and having respective openings at its upper and lower ends, the inner container being detachably fitted into an outer container in such a manner that a space having a predetermined volume is formed between the bottom portion of the inner container and a bottom portion of said outer container.

BRIEF DESCRIPTION OF THE DRAWINGS

The invention will now be described, by way of example, with reference to the accompanying drawings, in which.

DESCRIPTION OF THE PREFERRED EMBODIMENT

One embodiment of the present invention will now be described with reference to FIGS. 3 to 5.

Figure 1:
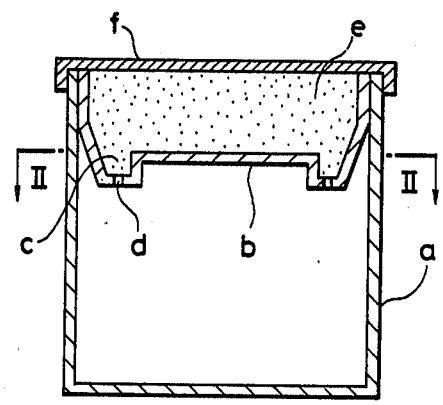
FIG. 1 is a sectional side view of a conventional dehumidifying container.
Figure 2:
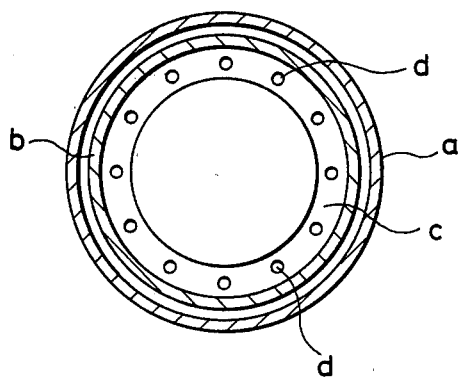
FIG. 2 is a sectional view taken along line II—II in FIG. 1.
Figure 3:
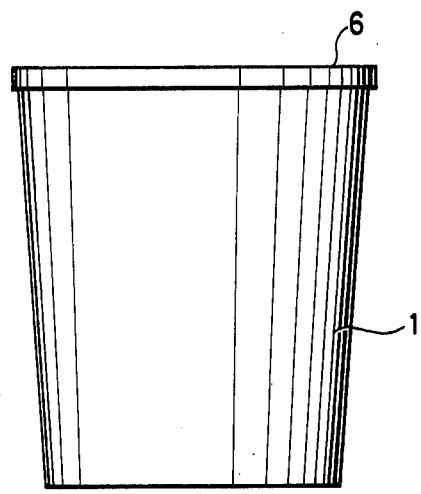
FIG. 3 is a side view of one example of a dehumidifying container constructed according to the present invention.
Figure 4:
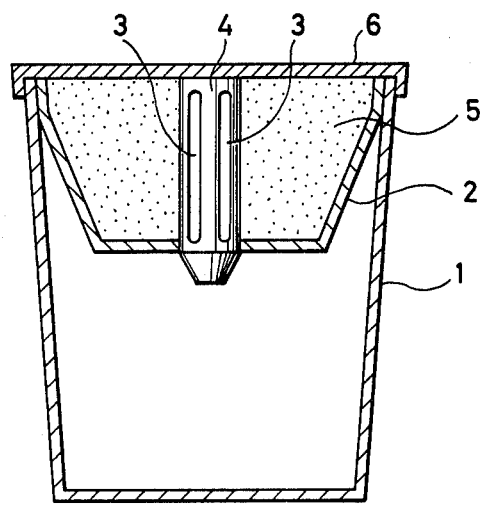
FIG. 4 is a sectional view of the dehumidifying container of FIG. 3.
Figure 5:
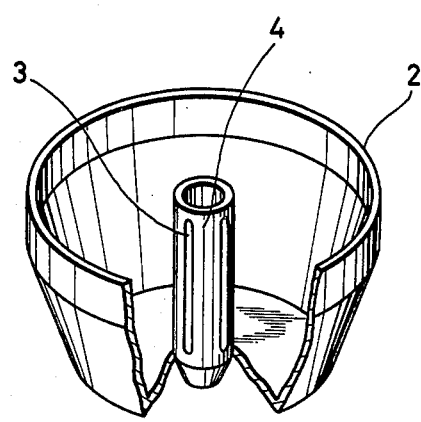
FIG. 5 is a perspective view, with a part cut away, of an inner container of the dehumidifying container of FIG. 4.

As shown in FIGS. 3 to 5, an inner container 2 in the form of an inverted circular truncated cone is fitted into an outer container 1 made of transparent material, in such a manner that containers 1 and 2 are closed and a space having a predetermined volume is formed between respective bottom portions of the two containers 1 and 2. A discharge pipe 4 open at the top and the bottom is provided upright at the center of the bottom portion of the inner container 2 in such a manner that it penetrates the bottom portion of the inner container. The pipe 4 has a suitable number of slits 3 of small width cut in its wall along its longitudinal axis. The top of the pipe 4 is set flush with the upper level, or the open end, of the inner container 2, and the lower end portion of the pipe 4 is tapered downwardly and protrudes downwardly from the bottom portion of the inner container 2. A dehumidifying agent 5, i.e. calcium chloride, fills the inner container 2. In FIG. 4, reference numeral 6 designates a cover, which keeps air from the dehumidifying agent 5 when the container is not in use.

In the above-described embodiment, a conventional means is provided in order to prevent the inner container 2 from dropping into the outer container 1. For instance, protrusions may be formed on the inner wall of the outer container to hold the inner container in place. The inner container 2 can be freely engaged with or disengaged from the outer container 1. The dehumidifying container may be so designed that the pipe 4 is fixedly secured to the inner container 2 or is detachably coupled thereto.

The dehumidifying container of the present invention constructed as described above is used as follows. First, the cover 6 is removed, and then the dehumidifying container is placed, for instance, in a closet which is to be dehumidified. The surface of the calcium chloride powder absorbs and catches any moisture in the air, as a result of which it becomes a calcium chloride solution through chemical reaction. The calcium chloride solution flows through the slits 3 into the pipe 4 at the centre of the inner container 2, and drops through the lower end opening of the pipe 4 into the outer container 1, where it forms a pool. In this case, as the pipe 4 is open at its top, dropping of the calcium chloride solution into the container 1 is facilitated. As the calcium chloride solution formed by catching moisture in the air flows continuously into the outer container 1 through the slits 3 of the pipe 4 as described above, the surface of the calcium chloride powder 5 is maintained in contact with the air without being disturbed by the moisture caught.

The calcium chloride solution in the outer container 1 can be readily discarded by removing the inner container 2 from the outer container 1. Thus, as long as the calcium chloride powder 5 remains in the container, the latter can dehumidify the air without being disturbed by the moisture caught.

Even if the dehumidifying container were to be accidentally knocked over the solution in the container 1 will never flow out, because the inner container 2 and the outer container 1 are gas-tightly fitted together and because the pipe 4 is positioned at the center and the lower end portion of the pipe 4 is conical.

Figure 6:
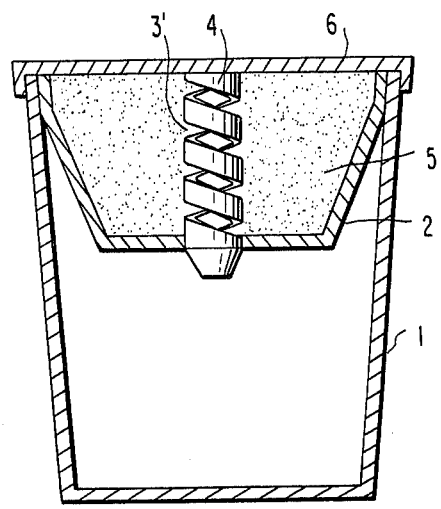
FIG. 6 is a sectional view of a dehumidifying container having spiral slits in a pipe contained therein.

In the above-described embodiment, the dehumidifying agent is calcium chloride. However, it will be understood that any dehumidifying agent can be utilized if it is high in moisture absorbing power. Furthermore, although in the above-described embodiment, the slits of the discharge pipe extend longitudinally, they may be modified into ones in the form of an intermittent spiral line 3' as shown in FIG. 6. In addition, the configuration of the container is not limited to that shown. It is obvious that the container may be fabricated from any material such as synthetic resin or plastics, waterproof paper or metal.

As has been described above, the moisture absorbed from the air flows readily through the slits of the discharge pipe into the outer container, where it forms a pool. Thus, the dehumidifying container of the present invention has excellent effects in that the period of time during which the caught moisture stays in the inner container 2 is relatively short, and accordingly a new surface of the dehumidifying agent is exposed at all times, which improves the dehumidifying effect.

What is claimed is:

1. A dehumidifier, comprising:
   a dehumidifying agent;
   an outer container; and
   an inner container having an upper end and a bottom portion interconnected with a side wall, said inner container containing said dehumidifying agent therein, said container having an opening at its upper end and having a discharge pipe provided upright from a center of said bottom portion, said discharge pipe having at least one slit in a wall thereof in the form of a spiral, said discharge pipe having respective openings at its upper and lower ends, said inner container being detachably fitted into said outer container in such a manner that a space having a predetermined volume is formed between said bottom portion of said inner container and a bottom portion of said outer container.

2. The dehumidifier claimed in claim 1 wherein said inner container side wall is solid so that solution formed by said dehumidifying agent contacting air is conveyed from said inner container to said bottom portion of said outer container only through said at least one slit in said discharge pipe.

3. A dehumidifier, comprising:
   a dehumidifying agent;
   an outer container; and
   an inner container having an upper end and a bottom portion interconnected with a side wall, said inner container containing said dehumidifying agent therein, said inner container having an opening at its upper end and a discharge pipe provided upright from a center of said bottom portion, said discharge pipe having at least one slit which continuously extends in a longitudinal direction of said pipe in a wall thereof and along a substantial length of said wall, said discharge pipe having respective openings at its upper and lower ends, said inner container being detachably fitted into said outer container in such a manner that a space having a predetermined volume is formed between said bottom portion of said inner container and a bottom portion of said outer container.

4. The dehumidifier claimed in claim 3 wherein said inner container side wall is solid so that solution formed by said dehumidifying agent contacting air is conveyed from said inner container to said bottom portion of said outer container only through said at least one slit in said discharge pipe.

5. The dehumidifier claimed in claim 1, 3, 2 or 4, wherein said open lower end of said discharge pipe protrudes downwardly from said bottom portion of said inner container.

6. The dehumidifier claimed in claim 1, 3, 2 or 4, wherein said discharge pipe is detachably mounted to said bottom portion of said inner container.

7. The dehumidifier claimed in claim 1, 3, 2 or 4, wherein the upper open end of said discharge pipe is flush with said upper end of said inner container.

8. The dehumidifier claimed in claim 1, 3, 2 or 4, wherein the lower end of the discharge pipe is tapered downwardly.

* * * * *